United States Patent [19]
Carr et al.

[11] Patent Number: 5,719,330
[45] Date of Patent: Feb. 17, 1998

[54] AUTOMOTIVE IGNITON MODULE DIAGNOSTIC

[75] Inventors: Mark Daniel Carr, Northville, Mich.; Frans Joseph Verbeke, Arlon, Belgium

[73] Assignee: General Motors Corporation, Detroit, Mich.

[21] Appl. No.: 560,128

[22] Filed: Nov. 17, 1995

[51] Int. Cl.$^6$ .................................................. G01M 15/00
[52] U.S. Cl. ........................ 73/118.1; 73/35.06; 73/117.3
[58] Field of Search ................................ 73/35.03, 35.04, 73/35.06, 118.1, 117.2, 117.3

[56] References Cited

U.S. PATENT DOCUMENTS

| | | | |
|---|---|---|---|
| 4,483,180 | 11/1984 | Ohbuchi et al. | 73/35.03 |
| 4,539,957 | 9/1985 | Haraguchi et al. | 73/35.03 |
| 4,565,171 | 1/1986 | Sugiura et al. | 73/35.03 |
| 4,583,175 | 4/1986 | Abe et al. | 73/35.03 |
| 4,599,982 | 7/1986 | Sugiura | 73/35.03 |
| 4,788,957 | 12/1988 | Komurasaki | 73/35.03 |
| 5,321,978 | 6/1994 | Brandt et al. | 73/116 |
| 5,347,856 | 9/1994 | Miyata et al. | 73/116 |
| 5,392,641 | 2/1995 | McCombie | 73/117.3 |
| 5,400,760 | 3/1995 | Miyata et al. | 123/630 |
| 5,467,638 | 11/1995 | Philipp | 73/35.06 |
| 5,492,007 | 2/1996 | Noble et al. | 73/117.3 |
| 5,493,227 | 2/1996 | Shimasaki et al. | 73/117.3 |
| 5,567,873 | 10/1996 | Toyoda | 73/117.3 |
| 5,574,217 | 11/1996 | McCombie | 73/116 |

*Primary Examiner*—George M. Dombroske
*Assistant Examiner*—Eric S. McCall
*Attorney, Agent, or Firm*—Michael J. Bridges

[57] ABSTRACT

Ignition modules for directly applying spark plug drive signals to spark plug pairs disposed in engine cylinders are diagnosed by issuing drive signals to the ignition modules and then monitoring the corresponding engine cylinders for misfire condition patterns. Consistent misfire activity in each cylinder controlled by an individual ignition module is interpreted as a fault condition in the ignition module or in its peripheral circuitry, facilitating fault condition identification and treatment.

16 Claims, 4 Drawing Sheets

AUTOMOTIVE IGNITON MODULE DIAGNOSTIC

FIELD OF THE INVENTION

This invention relates to automotive diagnostics and, more particularly to diagnosing ignition system fault conditions through misfire pattern detection.

BACKGROUND OF THE INVENTION

Internal combustion engine misfire conditions occur when an air/fuel charge in an engine cylinder is improperly consumed. Misfire conditions may be caused by a missing or improperly timed delivery of fuel, insufficient delivery of cylinder intake air, or a missing or improperly timed cylinder spark event. Reduced engine performance and fuel economy or increased engine emissions may result from a misfire condition. Misfire conditions must be diagnosed and treated as soon as possible so that the negative effects of the condition are minimized. To facilitate efficient treatment of the misfire condition, the misfire diagnosis should provide as much identification information about the misfire condition as possible, such as the source of the condition. Several proposals have been made for detecting a presence of a misfire condition. Some proposals attempt to attribute the misfire to a specific engine cylinder, to improve fault treatment efficiency.

Direct ignition systems DIS (also called distributorless ignition systems) are known in which opposing engine cylinders are paired for ignition control. Each cylinder pair has a single ignition drive DIS module for issuing a periodic ignition drive signal to the spark plugs of both of the pair of cylinders. A single point failure in a DIS module or in the control signal from an engine controller to a DIS module can lead to improper combustion in the pair of cylinders, such as may be diagnosed as a misfire condition. Conventional misfire detection proposals may detect a single cylinder misfire condition caused by a DIS module fault condition, but cannot diagnose the DIS module itself. Misfire condition treatment, such as through repair or replacement of the DIS module cannot then be carried out without further diagnostic procedures, which may add cost and increase vehicle downtime, and which may be prone to misdiagnosis.

Multiple cylinder misfire diagnostics are known which can detect a condition in which more than one engine cylinder is misfiring. However, such diagnostics commonly require that the misfiring cylinders be adjacent in the engine firing order. Further, such diagnostics do not provide for an analysis of the source or cause of any detected misfire condition. As a result, misfires resulting from DIS failures are either not diagnosed under such approaches, or are only diagnosed through additional, costly and time consuming diagnostic procedures.

It would therefore be desirable to diagnose a DIS module fault condition or a fault condition in the control signal applied to a DIS module that leads to an engine misfire condition in the corresponding pair of cylinders, to facilitate efficient misfire detection, identification, and treatment.

SUMMARY OF THE INVENTION

The present invention provides a desirable DIS module diagnostic by monitoring misfire activity in pairs of engine cylinders corresponding to each DIS module of an internal combustion engine, and by determining a presence of a DIS module fault condition or a fault condition in the control signal applied to the DIS module when the misfire pattern of the corresponding cylinder pair indicates a persistent misfire pattern.

More specifically, the present invention may be applied as a supplement to a conventional misfire detection approach for providing misfire source identification information when a misfire is detected, or for independently monitoring the performance of the DIS module and the control signal or signals applied thereto, wherein any material performance deterioration thereof is interpreted as a misfire condition. When activated, the diagnostic of the present invention monitors the activity of pairs of engine cylinders, wherein the pairs are defined as those cylinders having spark plugs driven by a common DIS module. Misfire conditions are detected and logged for each of the pairs over a test period. At the conclusion of the test period, the level of misfire activity for each of the pairs is compared to a threshold level of activity. A DIS module or control signal fault condition is indicated for any DIS module corresponding to a pair of cylinders having a level of misfire activity exceeding the threshold level over the test period.

In a further aspect of this invention, the threshold level of activity is made variable as a function of the engine operating level, such as indicated by engine speed and load. In yet a further aspect of this invention, the misfire detection is provided by monitoring sub-cyclic engine speed information at a level indicating the contribution of each individual engine cylinder combustion event to engine output torque. A significant decrease in a contribution from any one cylinder corresponds to a detected misfire condition. When a significant decrease in the contribution is detected for both cylinders of any of the pairs, the condition is attributed to a DIS module failure or to a failure in the control signal or signals applied to the DIS module. The DIS module failure is then logged and the number of such logged conditions compared to the threshold level at the conclusion of the test period to determine a material fault condition. In yet a further aspect of this invention, the significant decrease in the contribution is determined by comparing the level of contribution from each cylinder to a threshold level of contribution determined as a function of the current engine operating level, as indicated, for example, by engine speed and engine load.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
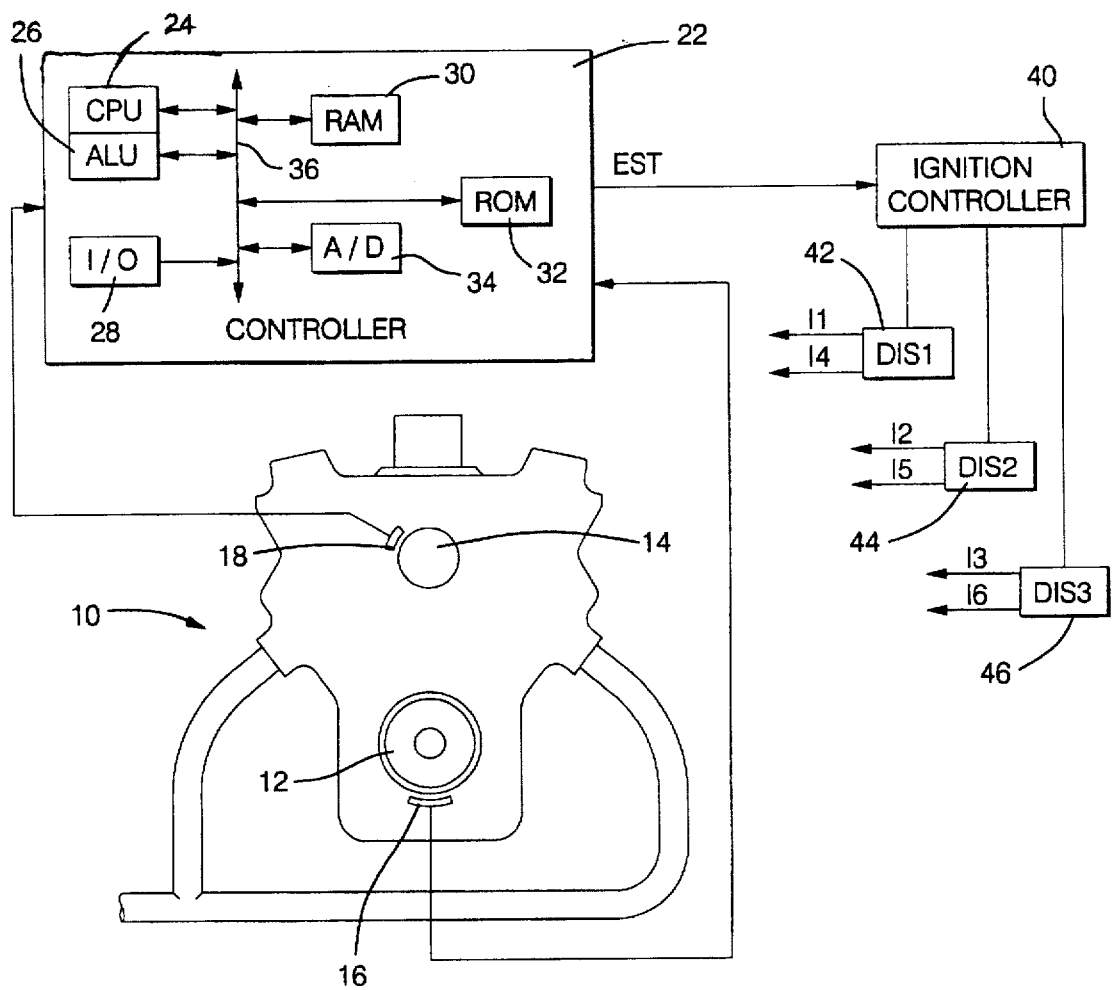
FIG. 1 is a general drawing of the engine and engine control hardware of the preferred embodiment.

Referring to FIG. 1, an internal combustion engine 10 having output shaft 12, such as a crankshaft, communicates passage of a plurality of teeth or notches (not shown) disposed about the circumference of the output shaft 12 by a conventional wheel speed sensor 16, such as a variable reluctance or Hall effect sensor. The sensor 16 is fixedly positioned relative to the output shaft 12 to have a magnetic field generated by the sensor disrupted in a predictable manner by the passage of the teeth. The sensor transduces such disruption into a substantially sinusoidal output voltage signal having a period corresponding to the rate of passage of the teeth by the sensor wherein each cycle of the signal corresponds to a passage of a tooth or notch of the wheel past the sensor. The engine angular position within an engine cycle may thereby be sensed wherein predetermined engine cylinder events correspond to cycles of the periodic signal. In this embodiment, at least three teeth are disposed on the output shaft 12 in position to pass the sensor 16, such that with a six cylinder, four cycle engine of the present embodiment, at least six teeth pass the sensor 16 for each engine cycle, each one corresponding to an event of a corresponding one engine cylinder. The sensor 16 output is communicated to an engine controller 22.

A camshaft 14 is provided for engine cylinder valve control with a rate of rotation proportional to the rate of rotation of the output shaft 12. In this embodiment including a six cylinder, four-stroke engine, the camshaft completes one revolution per engine cycle, or rotates at half the angular rate of the engine crankshaft. The rate of rotation of the camshaft 14 may be detected by any conventional wheel speed sensing means 18, such as with a variable reluctance or Hall effect sensor located so a single tooth (not shown), located on the circumference of the camshaft 14 may pass the sensor 18 in the manner described for the crankshaft 12, wherein a substantially sinusoidal signal is generated by the sensor, the frequency of which is proportional to the angular rate of the camshaft 14. The signal is communicated to the controller 22.

In this embodiment, the tooth or notch on the camshaft 14 is located in a manner coordinated with the location of the teeth on the output shaft 12, whereby the camshaft tooth indicates the start of an engine cycle. For instance, the CAM tooth or notch and the sensor 18 are positioned so that the tooth or notch passes the sensor 18 after the passage of the output shaft tooth or notch for the last cylinder in the engine cylinder firing order and before the passage of the output shaft tooth or notch for the first cylinder in the engine cylinder firing order, so as to indicate the end of the engine cycle.

The controller 22 may be a standard eight bit, single-chip microcomputer, such as a Motorola MC68HC11, having such conventional elements as a read only memory ROM 32 for storing permanent data constants, such as individual constants and constants stored in the form of conventional lookup tables, and control, diagnostic, and maintenance instructions in the form of software routines. The controller further includes random access memory RAM 30, for short term or fast access data value storage, analog to digital conversion devices A/D 34 for translating analog input signals into digital equivalents, input/output circuitry I/O 32 for transmitting and receiving signal information to and from the controller 22, and a central processing unit CPU 24 having arithmetic logic circuitry ALU 26 for carrying out mathematical operations on data and for providing control signals to manage controller functions in a manner generally understood in the art. Address and data information is passed between the elements of the controller 22 via a conventional bus network 36. The CPU 24 executes a series of operations in the form of software routines to read, condition, and store inputs from vehicle sensors and to generate and issue a number of control signals to engine control and diagnostic actuators and indicators. An ignition timing command signal EST is issued by the controller 22 in this embodiment to an ignition controller 40 indicating the time of issuance of spark plug drive commands. The drive commands are issued to direct ignition system DIS modules DIS1 42, DIS2 44, and DIS3 46 in this embodiment. Only one of the modules receives a drive command at any one time. The modules issue spark plug energization signals to a pair of spark plugs (not shown) disposed in a corresponding pair of engine cylinders. Specifically, DIS1 42 issues spark plug energization signals I1 and I4 to spark plugs in respective first and fourth cylinders in the engine firing order, DIS2 44 issues spark plug energization signals I2 and I5 to spark plugs in respective second and fifth cylinders in the engine firing order, and DIS3 46 issues spark plug energization signals I3 and I6 to spark plugs in respective third and sixth cylinders in the engine firing order. When the engine angular position is such that a combustion event is to occur in a cylinder (an active cylinder), the ignition controller 40, in response to a timing command EST from the controller 22, will issue a drive signal to the DIS module controlling the signal to the active cylinder, and such DIS module will then issue a drive signal to the two corresponding spark plugs.

Figure 2:
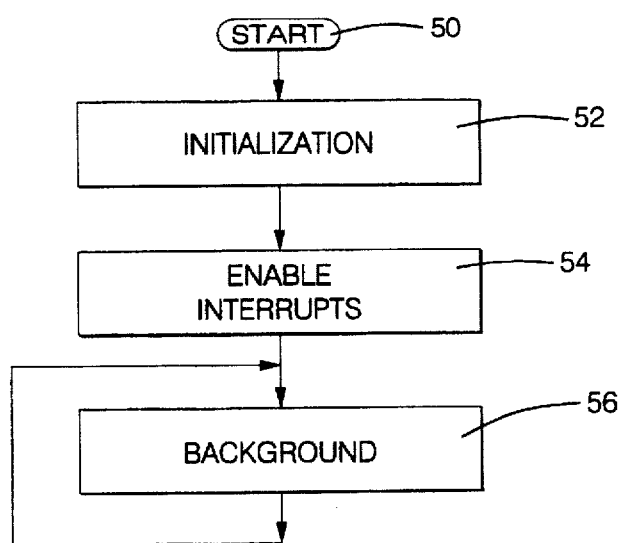
FIGS. 2–4 are diagrams illustrating a flow of controller operations for carrying out the steps of the invention in accord with a preferred embodiment.
Figure 3A:
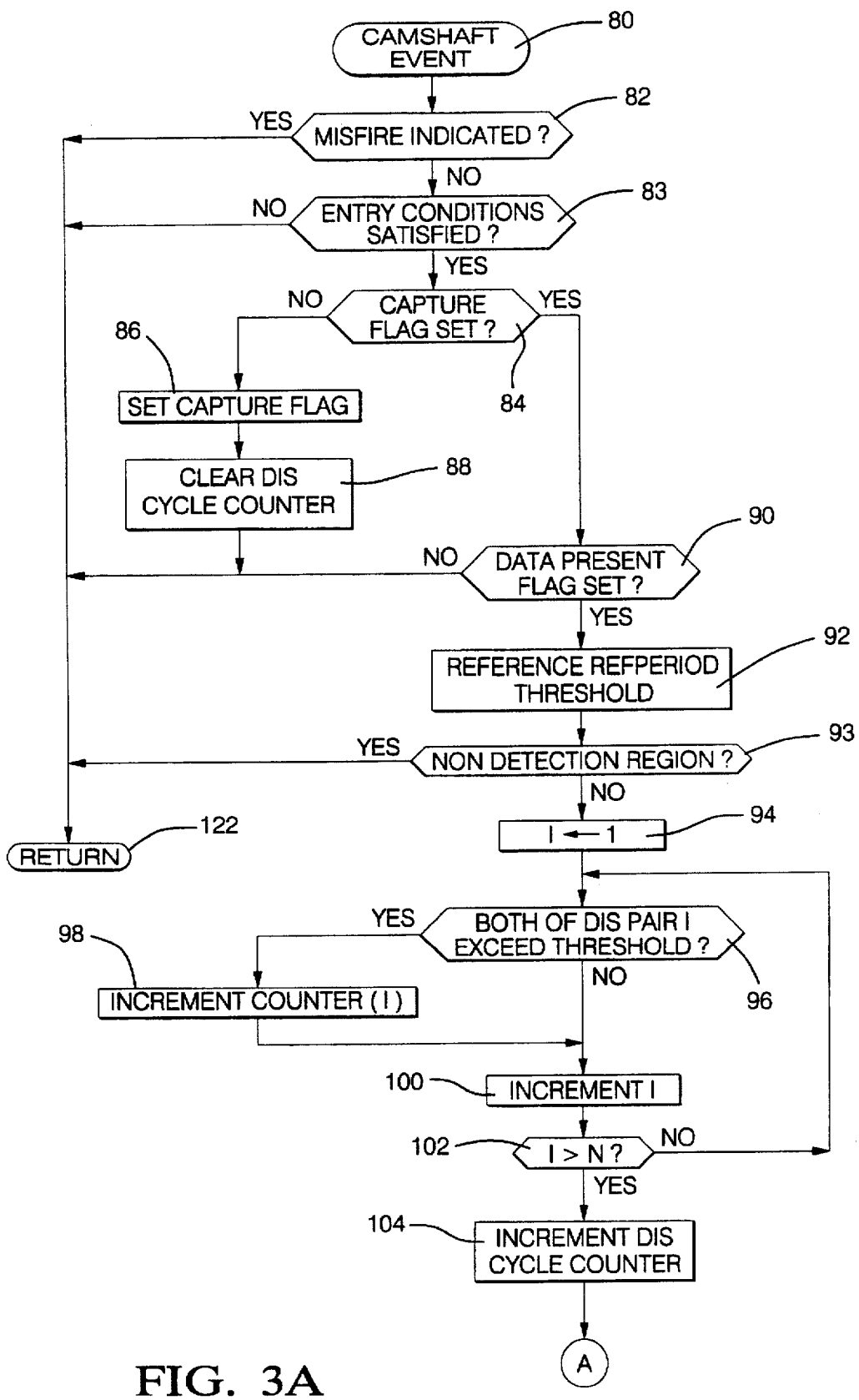
Figure 3B:
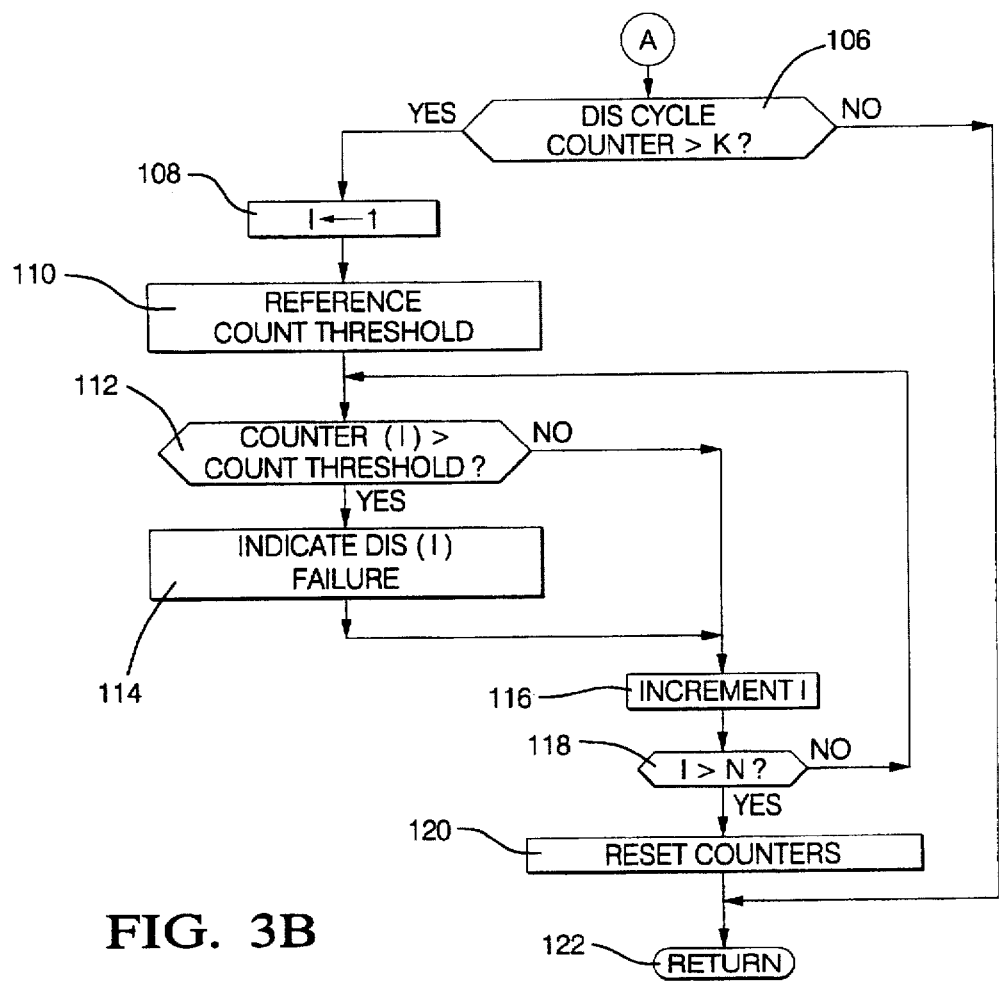
Figure 4:
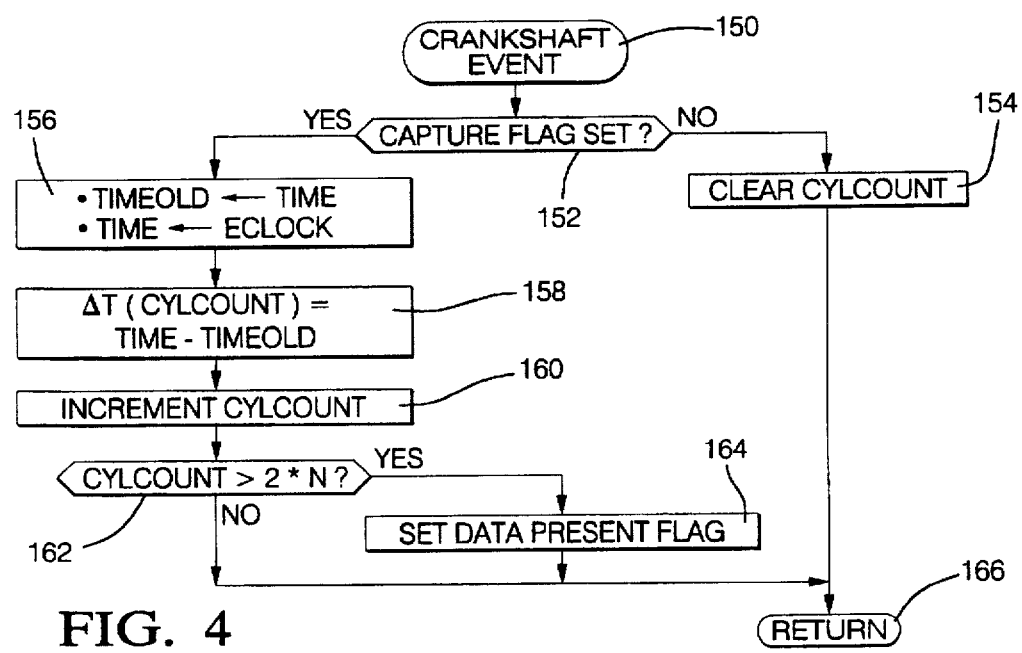

The series of operations of the controller 22, such as executed in a step by step manner while ignition power is manually applied to the controller, include the operations illustrated in the routines of FIGS. 2–4. Specifically, these routines provide for monitoring of engine cylinders for deviations in performance of a pattern corresponding particularly to a DIS fault condition or of a fault condition in a DIS module drive signal.

The operations of FIG. 2 are initiated at a step 50 upon occurrence of an engine startup operation, such as a manual application of power to the controller 22, and proceeds to a next step 52 to provide for controller initialization, including the processes of transferring data constants to RAM 30 locations, setting pointers, counters, and flags to initial values, etc. In this embodiment, the counters COUNTER1, COUNTER2, and COUNTER3, the pointer I, the DIS cycle counter, the locations TIME and TIMEOLD, the capture and data present flags, and the counter CYLCOUNT are cleared as part of the initialization operations. Following controller initialization, a series of interrupts are enabled including timer and event-driven interrupts set up to occur following certain pre-established time-based or engine event-based events. Interrupt vectors are provided in ROM 32 (FIG. 1) to store vectors for each of such interrupts, to direct the controller to carry out specific service operations upon occurrence of the corresponding interrupt. Such interrupts include a camshaft event interrupt that occurs following each passage of the tooth or notch of the camshaft by its corresponding sensor 18 (FIG. 1). Further, the interrupts include a crankshaft interrupt set up to occur following each passage of a tooth or notch corresponding to an engine cylinder event by the crankshaft position sensor 16 (FIG. 1). After enabling interrupts, background operations are repeatedly executed while the controller is operating as outlined at the step 56, including such operations as general conventional controller maintenance and diagnostic operations.

Upon occurrence of an interrupt, the background operations or any operations set up with a lower priority than the current interrupt service operations are temporarily suspended and the CPU 24 is directed to execute the interrupt service operations for the active interrupt. The interrupt service operations for the camshaft event interrupt, occurring when the camshaft tooth or notch passes the corresponding sensor 18 (FIG. 1) are illustrated in FIGS. 3A and 3B, beginning at a step 80, and proceeding to determine, at a step 82, if a misfire condition is currently stored in controller memory, such as in a non-volatile portion of RAM 30. A misfire condition may be detected through any conventional approach, such as that described in the U.S. Pat. No. 5,345,817, or U.S. Pat. No. 5,431,044, both assigned to the assignee of this invention, or the approach of pending U.S. application, Ser. No. 08/236,812, filed May 2, 1994, assigned to the assignee of this invention. The detected misfire condition may be detected as a pattern of engine speed change, a variation away from a determined normal spark plug energization signal, or as a specific low power combustion condition of one or more engine cylinders, and indicated by storing one or more misfire codes in controller memory. If such a condition is determined to be present at the step 82, the present DIS failure detection may be avoided by bypassing the operations of the routine of FIGS. 3A and 3B and moving directly to a step 122 at which the controller is directed to return to continue carrying out the background operations that were temporarily suspended upon occurrence of the camshaft event interrupt. The steps of the routine of FIGS. 3A and 3B are avoided if a misfire is detected, in this embodiment, as such a misfire condition may affect the accuracy of the DIS module diagnostic, and as a diagnosis of a condition requiring attention has already been indicated. Alternatively, the present diagnostic may continue despite the sensed misfire condition, by omitting the step 82 and proceeding directly from the step 80 to the step 83. Such provides that any misfire condition may be further analyzed through the approach of this invention to determine if it is caused by a DIS failure condition, to facilitate fault identification and treatment procedures, as described.

Returning to the step 82, if a misfire condition is not detected, entry condition are analyzed at a next step 83 to determine if the engine is operating in a condition in which DIS fault condition may be detected through misfire analysis in accord with this invention. Specifically, such entry conditions may correspond to any conventional conditions required to be present before conventional misfire diagnostic that make use of engine speed information are executed. For example, a stable engine speed may be required wherein any engine speed change over a sample period must be within calibrated limits. Likewise a substantially stable intake air valve position may be required, an air conditioner compressor clutch must not be in transition, and intrusive diagnostic of other engine components or systems may be required to not be currently active. If any of the conventional entry conditions are determined to not be met at the step 83, the current diagnostic iteration is not continued and the described step 122 is executed. Alternatively, if the entry conditions are all met at the step 83, then a capture flag stored in RAM 30 (FIG. 1) is examined at a next step 84. The capture flag is set to request that a set of reference period values be calculated and stored for analysis in RAM 30 (FIG. 1). If the capture flag is not set at the step 84, it is set at a next step 86 to initiate the data gathering. A DIS cycle counter, to be described, is next cleared at a step 88, and the step 122 is then executed to return to any suspended operations, as described.

Returning to the step 84, if the capture flag is set, a request has already been made to gather engine speed information for use in the current diagnostic, and the routine moves to a next step 90 to analyze a data present flag stored in a predetermined location in RAM 30 (FIG. 1) to determine if the requested data has been received. This data present flag is set in a crankshaft interrupt service routine, to be described. If the data present flag is not set, the routine moves to the described step 122 to return to any suspended operations, as described. If the data present flag is set, a set of reference period values have been stored through the operations of the crankshaft interrupt service routine of FIG. 4, to be described, representing the time delay between tooth or notch passages by the crankshaft position sensor 16 of FIG. 1, representing sub-cyclic engine speed information.

Figure 7:
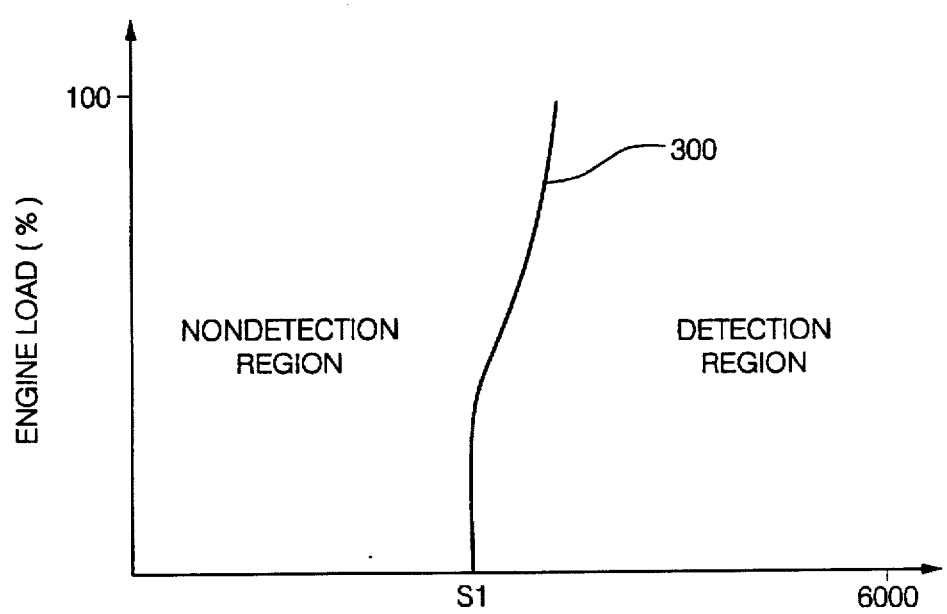
FIG. 7 is a graphical illustration of the engine operating levels in which a DIS module failure condition is detectable in the preferred embodiment.

The routine then proceeds to analyze the stored information by first referencing a REFPERIOD threshold as a function of an average engine speed and current engine load representing a maximum reference period for the corresponding engine speed and load that corresponds to a non-misfiring engine cylinder. The transient engine speed decrease caused by a misfire condition in an engine cylinder can be measured as an increase in the reference period corresponding to that cylinder. The REFPERIOD threshold is provided to distinguish such increases in the reference periods from those that may occur under conditions other than misfire conditions. The REFPERIOD threshold may be determined through a conventional calibration process, for example by setting engine speed and load to specified levels along the expected engine speed and load ranges, inducing misfire conditions in engine cylinders and determining the amount of increase in the reference periods that is associated with the misfire conditions, set high enough above the reference period associated with non-misfire conditions to accurately distinguish the two conditions. The calibrated values may be stored in the form of a conventional lookup table in ROM 32 (FIG. 1). The engine speed and load conditions may further be used to define non-detection regions in which a reliable DIS module diagnosis via misfire detection is not available. FIG. 7 illustrates a representative boundary 300 between engine operating regions in which DIS module fault conditions may be detected through the approach of this invention (Detectable Region) and regions in which such conditions may not be detected (Nondetection Regions). Such boundary 300 may be determined through a conventional process of analyzing the regions, using a specific known misfire detection approach, that misfire conditions may be accurately detected so as to detect a DIS module fault condition. If the engine speed and load define an engine operating level with the nondetection region at a next step 93, the misfire diagnostic is temporarily discontinued by proceeding to the described step 122, until the engine speed and load define an operating condition within the detection region, for example of FIG. 7. If the engine speed and load correspond to an engine operating level within the detection region at the step 93, the diagnostic continues by setting a pointer I to one at a step 94, and then determining if both of an Ith pair of engine cylinders corresponding to DIS(I) are currently misfiring, as indicated by a corresponding reference period for each of the cylinders exceeding the referenced REFPERIOD threshold.

In this embodiment, the following cylinder pairs are defined: cylinders 1 and 4 for DIS1, 2 and 5 for DIS2, and 3 and 6 for DIS3. Each of the cylinders includes at least one spark plug. The spark plugs of each of these pairs are driven by the single corresponding DIS module, as described. Accordingly, if the ignition control performance of any DIS module or the circuitry for generating and providing the control signal or signals to any DIS module is deteriorated, the combustion quality for the pair of cylinders may be negatively affected. Detection of the deterioration is provided in this embodiment by analyzing the contribution of each pair of cylinders to engine output torque as manifest by an increase in a corresponding reference period. The reference period for each cylinder is measured as the time delay between the two crankshaft events (passage of crankshaft teeth or notches by the crankshaft position sensor 16)

immediately following the combustion event in the cylinder. The first stored reference period $\Delta T(1)$ corresponds to the first cylinder in the firing order, the second stored reference period $\Delta T(2)$ corresponds to the second cylinder in the firing order, etc.

Figure 5:
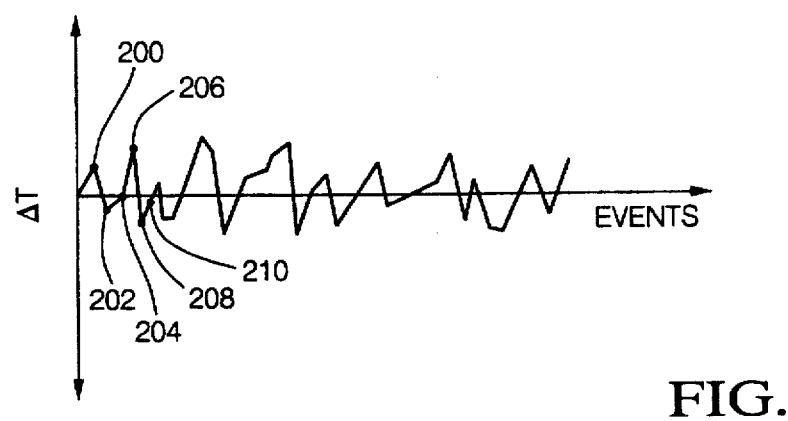
FIG. 5 is a graphical illustration of an engine speed pattern for a non-misfiring engine condition.
Figure 6:
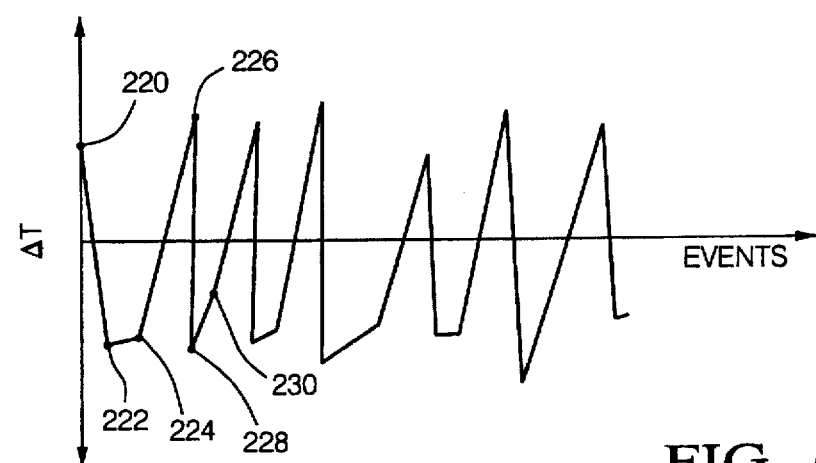
FIG. 6 is a graphical illustration of an engine speed pattern for a DIS module failure engine condition.

FIG. 5 illustrates a representative series of reference period magnitudes for an engine not experiencing a misfire condition. The point 200 is the reference period magnitude corresponding to the first cylinder in the engine firing order, 202 for the second, 204 for the third, 206 for the fourth, 208 for the fifth and 210 for the sixth. The magnitude of the reference period remains relatively small for all cylinders. FIG. 6 illustrates a representative series of reference period magnitudes for an engine experiencing a misfire condition in cylinders one and four due to a failure condition in DIS 1. The point 220 is the reference period magnitude corresponding to the first cylinder in the engine firing order, 222 for the second, 224 for the third, 226 for the fourth, 228 for the fifth and 230 for the sixth. The magnitude of the reference period remains relatively small for all cylinders, except for that of cylinders one and four. By setting the REFPERIOD threshold to a calibrated level so that the reference period magnitude for cylinders one and four is greater than the threshold and the magnitude for the other cylinders is less than the magnitude, the misfire condition may be detected to lead to a DIS failure identification.

Returning to FIG. 3A, the reference period for cylinders one and four corresponding to DIS1 of FIG. 1 are first compared to the REFPERIOD threshold at a step 96. If they both exceed the threshold, a counter COUNTER(I) (for I=1) is incremented to record the condition at a next step 98. COUNTER(I) may be a single counter for the pair of cylinders sharing the DIS(I) module, or may represent individual counters for each of the pair of cylinders, such as any individual cylinder misfire counters used in a general misfire detection system operating in the vehicle. Next, or if the reference period of either of the pair of cylinders does not exceed the threshold at the step 96, the pointer I is incremented at a next step 100 to point to the next DIS pair. The process of comparing the reference periods for each pair of cylinders sharing a DIS module and updating counters accordingly is continued for each pair of cylinders until the pointer I exceeds the number of pairs N, which is three in this embodiment, at a step 102. N may be stored as a ROM 32 (FIG. 1) constant equal, for example, to the number of cylinders of the engine divided by two.

If the pointer I exceeds the number of cylinder pairs N, which is three in this embodiment at the step 102, the analysis is complete for the present camshaft interrupt, and the counters are analyzed at the steps 104-120. Specifically, a DIS cycle counter is first incremented at a next step 104. The DIS cycle counter is used to maintain a count of the number of analyses of the reference period values that have been made for the current operating cycle of the engine. If the DIS cycle counter exceeds a calibrated constant K at a next step 106, then a sufficient number of misfire diagnostic routine iterations have occurred to analyze misfire frequency, for example to determine the persistence of any condition determined to have caused misfire conditions in cylinder pairs. In this embodiment, K is set to about one hundred.

If the counter is less than or equal to K at the step 106, further diagnostic information is required before the misfire counters may be further analyzed, and the described step 122 is executed. However, if the counter is greater than K at the step 106, the pointer or index I is reset to one at a step 108, and a count threshold is referenced as a function of the current engine operating level at a next step 110. The count threshold in this embodiment varies with engine speed and load, to account for variation in the frequency of reference periods exceeding the threshold for engine speed, as may be observed over the range of engine speeds and loads within the detectable region of FIG. 7 through a conventional engine calibration process, such as the process outlined at the step 92.

Each of the counters are next compared to the count threshold, by proceeding to and repeating for each counter COUNTER(I) a step 112, at which COUNTER(I) is compared to the threshold. It should be noted that COUNTER(I) may be a single counter for the pair of cylinders sharing the DIS(I) module, or may be a pair of counters corresponding to the pair of cylinders sharing the DIS(I) module. If COUNTER(I) exceeds the count threshold, or if both of the counters for the pair of cylinders sharing the DIS(I) module exceed the count threshold, a failure in DIS module I is indicated at a next step 114, for example by storing a fault code in a non-volatile portion of RAM 30 (FIG. 1) to identify the DIS module which drives the spark plugs of the misfiring cylinders as deteriorated. Additionally at the step 114, an indicator (not shown) such as a lamp, chime, tone generator, or other conventional indicator in the vehicle interior near the vehicle operator may be energized by outputting a drive signal thereto from the controller 22, in a manner likely to alert the vehicle operator of the DIS failure condition. The indicator may be generic or may specify the individual DIS module experiencing the detected failure condition. IF the indicator for alerting the vehicle operator is generic, then the information stored in controller non-volatile RAM 30 (FIG. 1) should identify the DIS module that is assumed to be deteriorated, to facilitate identification and treatment of the source of the fault condition.

After indicating the failure condition for the Ith DIS module, or if no such failure was detected at the step 112, the pointer I is incremented at a next step 116 to point to the next counter COUNTER(I) or the next pair of counters, as described for an alternative embodiment. The steps 112, 114, and 116 are repeated in this manner until it is determined at a step 118 that I exceeds N, at which point the counters, including the cycle counter and the misfire counters are reset at a next step 120. Execution of the routine of FIGS. 3A and 3B may also be disabled at the step 120. The routine would remain disabled for the remainder of the current vehicle operating cycle until the next iteration of the step 54 of FIG. 2, for example by disabling the interrupt or by temporarily disabling the controller operation that provides for execution of the operations of FIGS. 3A and 3B upon occurrence of the interrupt. Following the step 120, the described step 122 is executed to return to any suspended operations, such as background operations of the step 56 of FIG. 2.

The operations for servicing, in part, engine crankshaft events occurring when teeth or notches on the crankshaft corresponding to engine cylinder events pass the crankshaft position sensor 16 of FIG. 1, is illustrated in FIG. 4, and is initiated at a step 150 for each engine cylinder event indicated by a tooth or notch passage by the sensor 16 (FIG. 1). The routine of FIG. 4 provides for a determination of the reference periods that are used in the DIS diagnostic operations of the described routine of FIGS. 3A and 3B. Specifically, the routine proceeds, following a crankshaft event corresponding to an engine cylinder event, to a step 152 to determine if the capture flag is set indicating a request for reference period information. If the flag is not set, a counter CYLCOUNT of the number of stored reference periods is cleared at a step 154 and the routine is next exited at a step 166 to return to any operations, such as background operations, that were temporarily suspended to provide for the servicing of the current crankshaft interrupt.

If the capture flag is set at the step 152, the routine continues by proceeding to store the value of a memory location labeled as TIME into a location labeled as TIMEOLD at a next step 156. Such memory locations may be in RAM 30 (FIG. 1). The current value of a standard conventional free-running controller clock ECLOCK is then stored in the location labeled TIME, to indicate the time of the current crankshaft interrupt. Thus, the locations TIME and OLDTIME hold the clock value representing the time of the most recent two engine cylinder events indicated by crankshaft tooth or notch passages. The difference between TIME and TIMEOLD is next stored in memory location labeled ΔT(CYLCOUNT) at a next step 158 to record the reference period for the corresponding cylinder CYLCOUNT. The first stored value, labeled as ΔT(0) will not be used in the analysis of FIGS. 3A and 3B. Rather, the values ΔT(1) through ΔT(6) are used as the reference periods corresponding to the respective cylinders 1 through 6. After calculating and storing the reference period value at the step 158, CYLCOUNT is incremented to point to the next cylinder at a step 160 and is then compared to a value 2*N at a step 162. If CYLCOUNT exceeds 2*N, then all six reference period values have been stored pursuant to the request received in the form of a set capture flag, and the data present flag is then set at a next step 164. Next, or if CYLCOUNT does not yet exceed 2*N at the step 162, the described step 166 is executed to return to any suspended operations.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. A diagnostic method for an automotive internal combustion engine ignition system in which spark means of at least two engine cylinders are energized by a control signal issued by a single ignition control module in accord with a generated spark timing command, comprising the steps of:
   generating a spark timing command;
   sending a command to the single ignition control module to issue the control signal to the spark means of the at least two engine cylinders in accord with the generated spark timing command;
   diagnosing misfire conditions in each of the at least two engine cylinders;
   logging the diagnosed misfire conditions over a predetermined test period;
   comparing the logged misfire conditions to a predetermined threshold value; and
   indicating a failure condition in the single ignition control module when the number of logged diagnosed misfire conditions exceeds the predetermined threshold value.

2. The method of claim 1, wherein the predetermined threshold value varies as a predetermined function of an engine operating condition.

3. The method of claim 2, wherein the engine operating condition is indicated by engine speed and engine load.

4. The method of claim 1, wherein the diagnosing step comprises the steps of:
   sensing change in engine speed following predetermined combustion events in each of the at least two engine cylinders;
   comparing the sensed change in engine speed to a predetermined speed change threshold;
   diagnosing misfire conditions in an individual cylinder of the at least two engine cylinders when the sensed change in engine speed following a combustion event in the individual engine cylinder is greater than the predetermined speed change threshold.

5. The method of claim 1, wherein the diagnosing step comprises the steps of:
   sensing change in engine speed following predetermined combustion events in each of the at least two engine cylinders;
   sensing engine operating parameters indicating an engine operating level;
   referencing a speed change threshold value as a predetermined function of the sensed engine operating parameters;
   comparing the sensed change in engine speed to the speed change threshold value; and
   diagnosing misfire conditions in an individual cylinder of the at least two engine cylinders when the sensed change in engine speed following a combustion event in the individual engine cylinder is greater than the speed change threshold value.

6. In an automotive internal combustion engine having at least a first and a second engine cylinder and having an ignition control system including an ignition control module for electrically energizing a first spark plug of the first engine cylinder and a second spark plug of the second engine cylinder for providing combustion control in the first and second engine cylinders, a method for diagnosing an ignition control system failure condition, comprising the steps of:
   generating a spark plug drive signal;
   outputting the spark plug drive signal to the ignition control module;
   detecting misfire conditions in the first engine cylinder;
   maintaining a first count in a memory device of the number of detected misfire conditions in the first engine cylinder over a predetermined test period;
   detecting misfire conditions in the second engine cylinder;
   maintaining a second count in the memory device of the number of detected misfire conditions in the second engine cylinder over the predetermined test period;
   comparing each of the first and second counts to a predetermined count threshold value;
   diagnosing a failure condition in the ignition control system when both of the first and second counts exceed the predetermined count threshold value.

7. The method of claim 6, further comprising the step of determining the predetermined count threshold value as a predetermined function of an engine operating condition.

8. The method of claim 7, wherein the engine operating condition is indicated by engine speed and engine load.

9. The method of claim 6, wherein the step of detecting misfire conditions in the first engine cylinder further comprises the steps of:
   estimating engine output torque;
   detecting a change in engine output torque following a combustion event in the first engine cylinder;
   determining when the detected change corresponds to a decrease in engine output torque;
   comparing the detected change to a predetermined change threshold when it is determined that the detected change corresponds to a decrease in engine output torque; and detecting a misfire condition in the first engine cylinder when the detected change exceeds the predetermined change threshold.

10. The method of claim 9, wherein the estimating step estimates engine output torque by measuring variation in engine speed and estimating engine output torque as a function of variation in engine speed.

11. The method of claim 9, further comprising the steps of:

sensing engine parameters indicating an engine operating level; and referencing the change threshold as a predetermined function of the sensed engine parameters.

12. The method of claim 6, wherein the step of detecting misfire conditions in the second engine cylinder further comprises the steps of:

estimating engine output torque;

detecting a change in engine output torque following a combustion event in the second engine cylinder;

determining when the detected change corresponds to a decrease in engine output torque;

comparing the detected change to a predetermined change threshold when it is determined that the detected change corresponds to a decrease in engine output torque; and detecting a misfire condition in the second engine cylinder when the detected change exceeds the predetermined change threshold.

13. The method of claim 12, further comprising the steps of:

sensing engine parameters indicating an engine operating level; and referencing the change threshold as a predetermined function of the sensed engine parameters.

14. A diagnostic method for an ignition system in an internal combustion engine having n cylinders and n/2 ignition control modules for providing electrical drive signals for electrically driving spark plugs of the cylinders in response to an issued spark timing command, the engine cylinders being grouped into n/2 cylinder pairs with each cylinder pair assigned to a corresponding one of the ignition control modules for receiving electrical drive signals therefrom, comprising the steps of:

generating a spark timing command for timing the providing of the electrical drive signals;

issuing the generated spark timing command;

diagnosing misfire conditions in the engine cylinders over a predetermined test period;

maintaining a count in a memory device of the diagnosed misfire conditions for each of the n engine cylinders; and for each of the n/2 cylinder pairs, (a) comparing the maintained count for each cylinder of a cylinder pair to a predetermined count threshold value, and (b) indicating a failure condition in the ignition control module corresponding to the cylinder pair when the maintained count for each cylinder of the cylinder pair exceeds the predetermined count threshold value.

15. The method of claim 14, wherein the diagnosing step comprises the steps of:

for each of the engine cylinders, (a) sensing change in engine speed following a predetermined, periodic combustion event in the engine cylinder, (b) comparing the sensed change in engine speed to a predetermined speed change threshold, (c) diagnosing a misfire condition in the engine cylinder when the sensed change in engine speed corresponds to a reduction in engine speed and is greater than the predetermined speed change threshold.

16. The method of claim 15, further comprising the steps of:

sensing a current value of at least one predetermined engine operating parameter; and adjusting the magnitude of the speed change threshold as a predetermined function of the sensed current value.

* * * * *